US012799998B2

(12) United States Patent
Schwarz et al.

(10) Patent No.: US 12,799,998 B2
(45) Date of Patent: Nov. 17, 2026

(54) DISC BRAKE

(71) Applicant: BPW Bergische Achsen Kommanditgesellschaft, Wiehl (DE)

(72) Inventors: Michael Schwarz, Bergisch-Gladbach (DE); Arthur Neumann, Morsbach (DE); Christian Abt, Gummersbach (DE); Felix Fiedler, Wiehl (DE); Jürgen Kloss, Wiehl (DE); Torsten Schumacher, Nümbrecht (DE); Christian Severin, Neunkirchen (DE); Thomas Klaas, Reichshof (DE)

(73) Assignee: BPW Bergische Achsen Kommanditgesellschaft, Wiehl (DE)

(*) Notice: Subject to any disclaimer, the term of this patent is extended or adjusted under 35 U.S.C. 154(b) by 309 days.

(21) Appl. No.: 18/730,475

(22) PCT Filed: Jan. 2, 2023

(86) PCT No.: PCT/EP2023/050005
§ 371 (c)(1),
(2) Date: Jul. 19, 2024

(87) PCT Pub. No.: WO2023/138909
PCT Pub. Date: Jul. 27, 2023

(65) Prior Publication Data

US 2025/0129828 A1 Apr. 24, 2025

(30) Foreign Application Priority Data

Jan. 21, 2022 (DE) ..................... 10 2022 101 381.2

(51) Int. Cl.
*F16D 65/097* (2006.01)
*F16D 55/226* (2006.01)
(Continued)

(52) U.S. Cl.
CPC ......... *F16D 65/095* (2013.01); *F16D 55/226* (2013.01); *F16D 65/0056* (2013.01); *F16D 2055/0008* (2013.01)

(58) Field of Classification Search
CPC ............. F16D 65/0043; F16D 65/0972; F16D 65/0977; F16D 65/0978
See application file for complete search history.

(56) References Cited

U.S. PATENT DOCUMENTS

| | | | | |
|---|---|---|---|---|
| 4,460,067 | A * | 7/1984 | Katagiri | F16D 66/02 188/1.11 W |
| 12,687,207 | B2 * | 7/2026 | Shahin | F16D 65/0972 |

(Continued)

FOREIGN PATENT DOCUMENTS

| | | | |
|---|---|---|---|
| DE | 4332709 | A1 | 3/1995 |
| DE | 102014113617 | A1 | 3/2016 |

(Continued)

OTHER PUBLICATIONS

Translated German Search Report, Application No. 10 2022 101 381.2, dated Oct. 31, 2022, pp. 1-12.

(Continued)

*Primary Examiner* — Bradley T King
(74) *Attorney, Agent, or Firm* — BOND, SCHOENECK & KING, PLLC; George R. McGuire

(57) ABSTRACT

A disc brake is proposed with a brake carrier and brake linings consisting of a friction lining and a lining rear plate. The brake carrier has a lining well with mutually facing first supporting surfaces and with second supporting surfaces. Angle brackets with tabs are situated between the brake lining and the lining well, of which tabs an inner tab is supported against the inner side and the other tab is supported against the outer side of the brake carrier.

26 Claims, 3 Drawing Sheets

(51) Int. Cl.
*F16D 65/00* (2006.01)
*F16D 65/095* (2006.01)
*F16D 55/00* (2006.01)

(56) References Cited

U.S. PATENT DOCUMENTS

| | | | | |
|---|---|---|---|---|
| 2005/0236236 | A1 | 10/2005 | Farooq | |
| 2005/0284710 | A1 * | 12/2005 | Roberts | F16D 55/36 188/73.31 |
| 2014/0047690 | A1 * | 2/2014 | Plantan | F16D 55/2265 29/407.09 |
| 2014/0048360 | A1 * | 2/2014 | Plantan | F16D 65/183 188/73.31 |
| 2014/0367208 | A1 | 12/2014 | Miyake et al. | |
| 2015/0107944 | A1 | 4/2015 | Mallmann | |
| 2017/0248182 | A1 * | 8/2017 | Kim | F16D 65/0972 |
| 2017/0356511 | A1 * | 12/2017 | Aonuma | F16D 55/228 |
| 2019/0120308 | A1 * | 4/2019 | Weekley | F16D 55/2265 |
| 2019/0162259 | A1 * | 5/2019 | McGinn | F16D 65/0043 |
| 2019/0338816 | A1 * | 11/2019 | Denhard | F16D 55/228 |
| 2021/0239169 | A1 * | 8/2021 | Baek | F16D 65/0972 |
| 2024/0240681 | A1 * | 7/2024 | Wittlinger | F16D 65/095 |

FOREIGN PATENT DOCUMENTS

| | | | |
|---|---|---|---|
| DE | 102018005036 | A1 | 1/2020 |
| DE | 102021200969 | A1 | 8/2021 |
| EP | 0347523 | B1 | 8/1993 |
| EP | 0752541 | A1 | 1/1997 |
| EP | 1974150 | B1 | 6/2014 |
| EP | 2767725 | A1 | 8/2014 |
| KR | 20180133140 | A | 12/2018 |
| WO | 2008062894 | A1 | 5/2008 |

OTHER PUBLICATIONS

Translated International Search Report, Application No. PCT/EP2023/050005, prepared Apr. 3, 2023, mailed Apr. 13, 2023, pp. 1-12.

* cited by examiner

DISC BRAKE

CROSS-REFERENCE TO RELATED APPLICATION

The present application is the United States National Stage Application, filed under 37 U.S.C. 371, of International Patent Application No. PCT/EP2023/050005, filed on Jan. 2, 2023, which claims priority to German Patent Application 10 2022 101 381.2 filed Jan. 21, 2022, the entire contents of each of which is hereby incorporated by reference.

BACKGROUND OF THE INVENTION

The invention relates to a disc brake.

The invention also relates to a protective plate assembly suitable for use in the disc brake and to a brake lining with a protective plate assembly fixed thereon.

When repairing and maintaining motor vehicles or vehicle trailers, brake linings often have to be installed in poor visibility conditions, for example due to limited installation space or poor lighting. As brake linings are particularly important components for the safety of the vehicle, it makes sense to take suitable precautions with the aim of avoiding errors when installing them.

A brake caliper is known from EP 0 347 523 B1, in which additional projections or recesses are formed on the supporting surfaces of the brake carrier, which guide the brake linings during the axial brake application movement in order to ensure that it is possible to install only the intended brake linings at the points provided for this purpose. Their contours are matched to corresponding recesses or projections on the brake linings. The encoding achieved in this way is realized using production technology in that the encoding structures are also created during the machining of the supporting surfaces. This ensures that only the intended brake linings can be inserted into the brake carrier.

However, it is not possible to prevent a correct brake lining from being fitted in the wrong installation position.

DE 29 19 535 A1 and EP 0 752 541 A1 also relate to error prevention in the installation of brake linings. In the first-mentioned publication, pairs of brake linings are proposed whose friction linings are of different lengths in the circumferential direction. EP 0 752 541 A1 proposes an asymmetrical design of the lining rear plates and the supporting surfaces of the two brake linings. The asymmetrical geometry of the brake linings and the lining wells of the brake carrier can result in the brake exhibiting different operating behavior in the two possible directions of rotation.

DE 43 32 709 A1 also relates to the prevention of incorrect installation of brake linings in a floating caliper disc brake. Axial protrusions in the form of studs are integrally formed on the rear sides of the lining rear plates. If fitted incorrectly, the protrusions have the effect that the two brake linings cannot be fitted at a sufficient distance from one another for the brake disc to fit between them. If, on the other hand, the brake linings are fitted correctly, the distance between their friction surfaces is large enough to accommodate the brake disc between them. Placement of the floating caliper on the brake disc with the brake linings inserted in it, e.g. rotated by 180°, is avoided.

DE 10 2014 113 617 A1 discloses a disc brake with brake linings that are inserted into lining wells of a brake carrier and consist of a friction lining and a lining rear plate. A spring element with two resilient ends is arranged between a side edge of the lining rear plate and a carrier horn of the brake carrier. The first end is designed to support the brake lining against a base region of the carrier horn. The second end is designed to support the brake lining against a head region of the carrier horn. The brake lining itself is designed asymmetrically in relation to its center in the circumferential direction, so that it cannot be inserted into the lining well rotated by 180°.

EP 1 974 150 B1 describes a disc brake with a brake carrier in the form of a flat plate. The brake carrier is provided with a lining well for the brake lining. The lining well is provided with guide surfaces extending in the brake application direction, but the brake lining is actually guided by means of additional wear plates that are inserted into the lining well between the brake lining and the lining well. A radial and a tangential guide surface for the brake lining is situated on each wear plate. The wear plates are provided with tabs to fix them to the brake carrier, with the first tabs extending over the inner side and the second tabs over the outer side of the brake carrier.

DE 10 2021 200 969 A1 and DE 10 2018 005 036 A1 each disclose disc brakes in which spring plates are provided between a brake lining and a brake carrier. For installation, the spring plates are first arranged on the brake carrier and then the brake linings are inserted into the spring plates axially, i.e. parallel to the axis of rotation of the brake disc.

It is known from US 2014/0367208 A1 to provide return spring plates arranged on the brake lining.

SUMMARY OF THE INVENTION

The invention is based on the object of developing a disc brake in which, during insertion of a brake lining, it is possible to recognize both whether this lining is intended for the disc brake and also whether it is being mounted in the correct installation position.

Firstly, a disc brake having the features of claim 1 is proposed as a solution. Inter alia, this brake consists of a brake carrier that can be mounted on a vehicle axle and a brake caliper that bridges the brake linings arranged on the inner side or outer side of a brake disc. The brake linings consist of a friction lining facing the brake disc and a lining rear plate, wherein a pressure member guided in the brake caliper can be applied against the lining rear plate of the inner brake lining.

For receiving the inner brake lining, the brake carrier has a lining well with two first mutually facing supporting surfaces for supporting the brake lining in the circumferential direction and second supporting surfaces for supporting the brake lining radially inwards. The brake carrier is flat, at least around the lining well, with an inner side and a parallel outer side.

A bracket is arranged between the brake lining and each first supporting surface, on which bracket tabs are formed for fixing it in the brake application direction, of which an inner tab is supported against the inner side of the brake carrier and an outer tab is supported against the outer side of the brake carrier. In this way, the brackets are locked to the brake carrier in the brake application direction or against the brake application direction.

The brackets are fixed to the lining rear plate by means of retaining elements, wherein in the brake application direction the fixing force of the retaining elements is lower than the fixing force of the tabs supported against the inner side of the brake carrier.

At least one of the brackets is provided with a single mounting indicator which, when mounted, is situated in a plane E situated between the two planes in which the inner side and outer side of the brake carrier are situated. In the brake application direction, the spacing of the plane E from the plane of the inner side firstly and from the plane of the outer side secondly is of different magnitude.

For this reason, the plane E, in which the mounting indicator—of which there is of course only one—is situated when the brake lining is correctly mounted, is not situated in the center between the inner side and outer side of the brake carrier, but outside this center. In addition, in the same plane E, the brake carrier is provided with a structure—of which there is also only one—in which the mounting indicator engages or, conversely, which engages in the mounting indicator.

The basic idea of this solution is that the mounting indicator on the bracket only engages with the structure on the brake carrier when the friction lining is facing the brake disc and not when the lining rear plate is facing the brake disc. It is therefore already possible during the attempt to insert the brake lining into the brake lining well of the brake carrier to recognize whether the fitting is being done in the correct installation position.

If the installation position is incorrect, and in particular if it is rotated by 180°, the positions of the mounting indicator on the bracket and the corresponding structure on the brake carrier do not match. The brake lining with the bracket fixed to it then cannot be lowered completely into the lining well, with the result that a U-bolt that runs over the lining well then cannot be closed. It is therefore clear to the fitter that the brake lining has not been inserted into the lining well in the intended, i.e. correct, installation position. It can also be seen whether the brake lining is one that is intended for the brake. If this is not the case, the brake lining again cannot be inserted into the lining well.

Advantageous embodiments of the disc brake are indicated in the dependent claims.

In particular, it is proposed that the brackets are angle brackets whose main body consists of a radial limb and a tangential limb. Here, the terms “radial” and “tangential” are to be understood in relation to the axis of rotation about which the brake disc of the disc brake rotates. The outer side of the radial limb of the angle brackets rests against the first supporting surface, and the tangential limb rests against the second supporting surface.

The mounting indicator is situated on the outer side of the radial limb, i.e. on the side with which the radial limb rests against the first supporting surface of the lining well.

Preferably, further tabs are formed on the tangential limb, of which an inner tab is supported against the inner side and an outer tab against the outer side of the brake carrier.

Preferably, the surfaces on which the brackets are in contact with the first and second supporting surfaces of the lining well are arranged symmetrically in relation to the center of the lining well in the circumferential direction. The advantage of this symmetry is that the disc brake designed in this way works equally, i.e. with the same braking characteristic, in both possible directions of rotation.

With the aim of low-cost manufacturability, it is proposed that the brackets, including the tabs and the mounting indicator, are one-piece stamped and bent parts.

Preferably, the inner and outer tabs formed on the radial limb each consist of a base portion connected to the radial limb and a clamping portion extending away from the base portion, wherein the distances of the clamping portions of the tabs from one another are smaller than the distances of the base portions of the tabs from one another. In this case, it makes sense for the clamping portions to extend away from the base portions in the longitudinal direction of the relevant radial limb.

Preferably, the mounting indicator is formed on an edge of the radial limb facing away from the tangential limb. In this case, the mounting indicator is preferably connected to the edge over an 180° arc, and also extends parallel to the radial limb.

Preferably, the structure with which the brake carrier is provided is a recess into which the mounting indicator engages by immersion. The recess is, for example, a blind hole which is open facing away from the second supporting surfaces.

The retaining elements can be, for example, arms integrally formed on the brackets, wherein these arms engage in recesses on the rear side of the lining rear plate by immersion.

The recesses can be blind holes, wherein these blind holes are open facing away from the friction lining. In terms of production technology, it is advantageous if the retaining elements are fixed in the recesses using dowels. It is further proposed that the lining rear plate has struts on its rear side for weight reduction, which extend from a strut-free central region to a frame-shaped reinforcing edge, and that the recesses are situated in the frame-shaped reinforcing edge.

To achieve the above-mentioned object, a protective plate assembly and a brake lining with a protective plate assembly fixed thereto are also proposed.

BRIEF DESCRIPTION OF THE DRAWINGS

Further advantages and details are explained below with reference to an exemplary embodiment, which is shown in the drawings. In the drawings.

DETAILED DESCRIPTION

Figure 1:
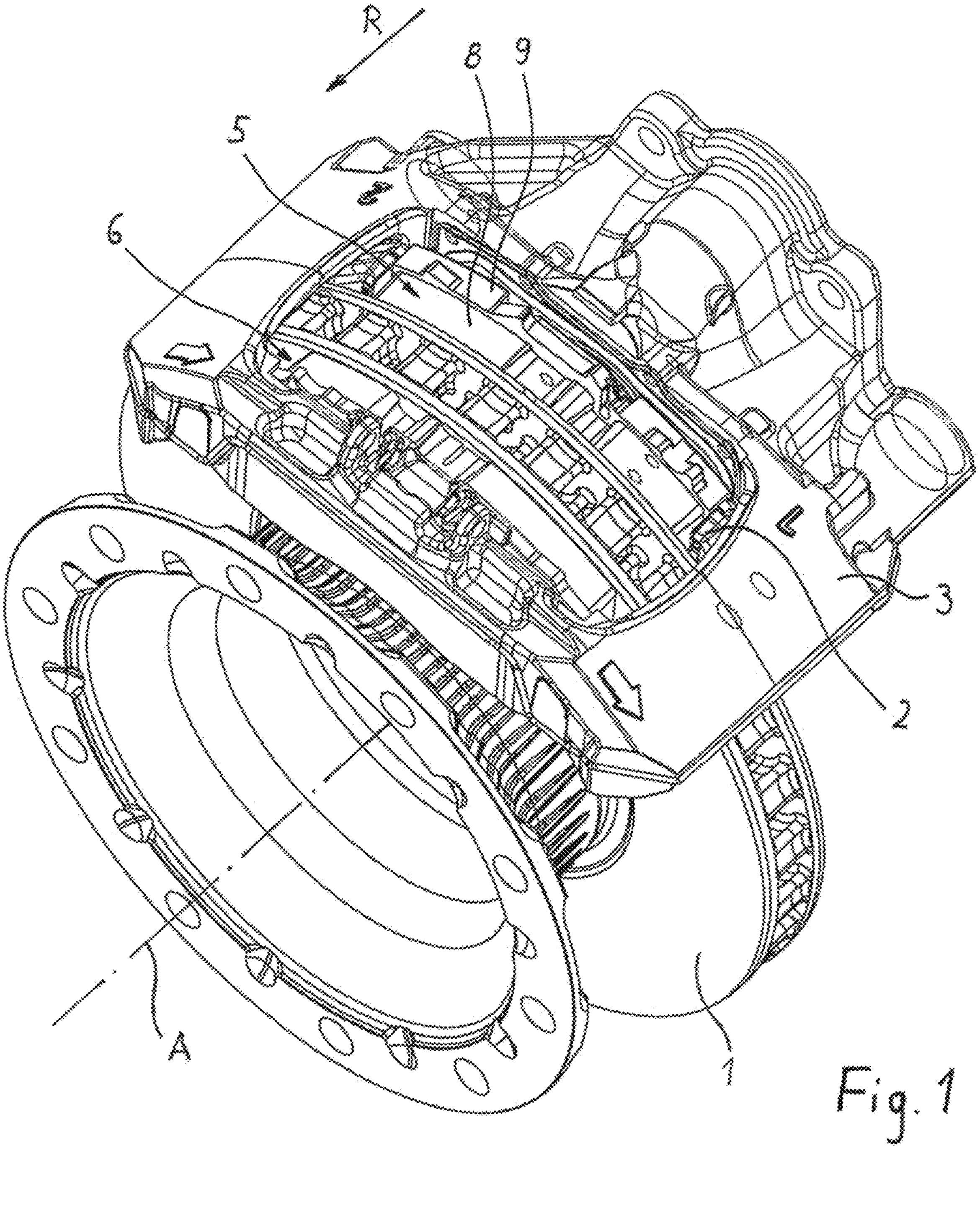
FIG. 1: is a perspective overall view of a disc brake for a vehicle.

The disc brake shown in FIG. 1 is of the floating caliper type and is, for example, a pressurized-air-operated commercial vehicle disc brake. The compensation caused by the wear of two brake linings 5, 6 and of the brake disc 1 is achieved by an adjustment device integrated into the brake caliper of the disc brake. The components of the disc brake are a rigid brake carrier 2, which is mounted fixed to the axle, and the brake caliper 3, which is mounted on the brake carrier 2 so that it can move longitudinally, i.e. in a floating manner.

A clamping device is situated on or in the brake caliper 3. This includes the mechanically, hydraulically, or preferably pneumatically driven mechanism for generating the brake application force as well as brake application elements for exerting an application force on the two brake linings 5, 6 of the disc brake. Preferably, a pressure member guided in the brake caliper exerts a brake application movement in the brake application direction R only on the action-side, inner brake lining 5, whereas the reaction-side, outer brake lining 6 in the brake application direction R is firmly seated in the brake caliper 3, which is mounted in a floating manner.

The two brake linings 5, 6, each arranged in lining wells of the disc brake, are usually composed of a friction lining 8 working against the brake disc 1 rotating on the axis of rotation A, and a rear-side lining rear plate 9. The lining rear plate 9 is larger in its dimensions than the friction lining 8, so it preferably protrudes past the friction lining 8 on all sides. Support forces during braking are therefore dissipated into the surrounding lining well via the lateral edges 9A of the lining rear plate 9 and not via the friction lining 8.

The supporting surfaces on the lining rear plates 9 that transfer the braking forces to the lining well are preferably symmetrical to the center of the brake linings in the circumferential direction, so that the brake exhibits the same braking characteristic in both possible directions of rotation.

Figure 2:
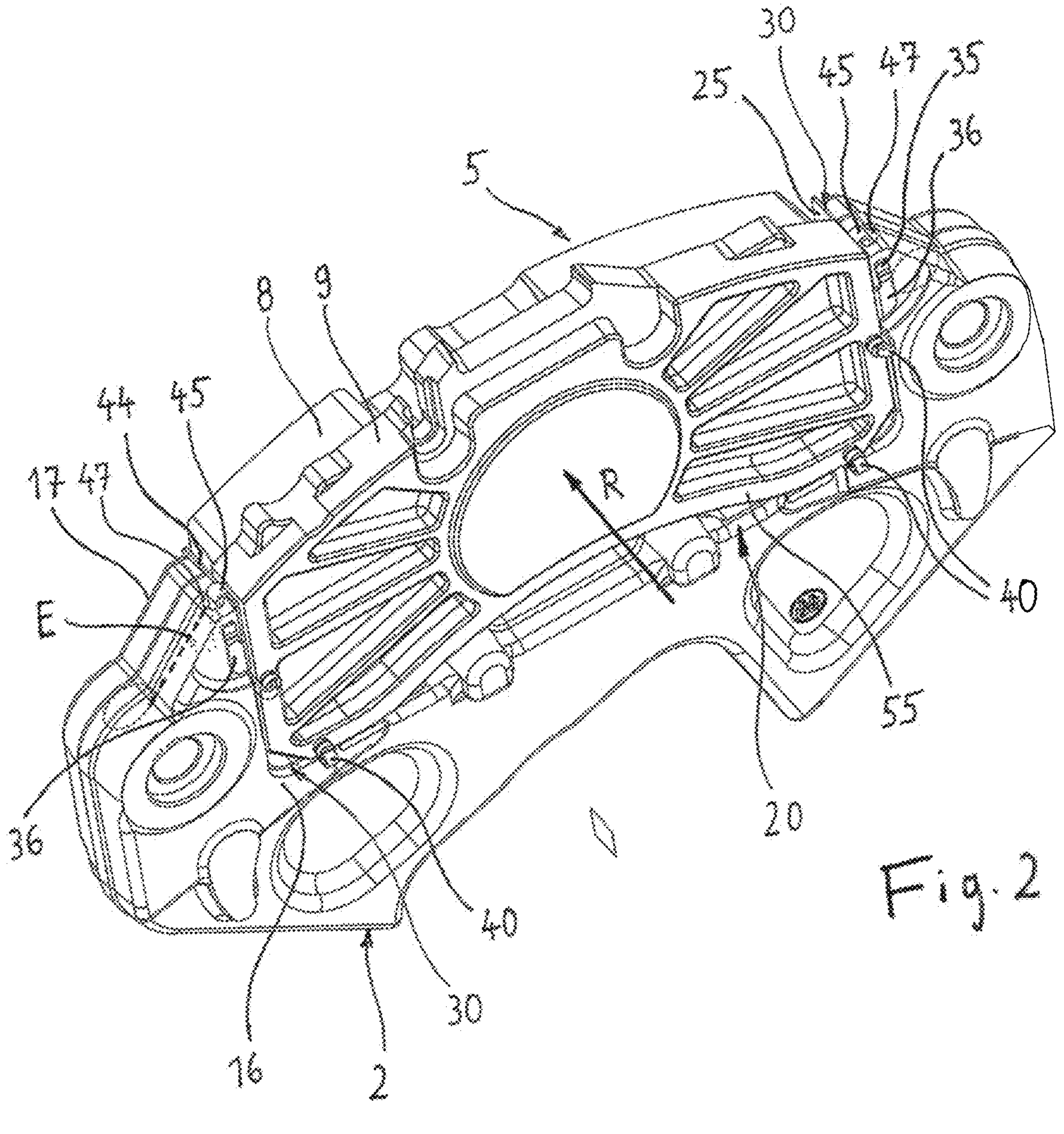
FIG. 2: is a perspective view of the brake carrier of the disc brake with a brake lining mounted in the lining well of the brake carrier, wherein the brake lining is provided with a protective plate assembly consisting of two angle brackets temporarily fixed to the brake lining.
Figure 3:
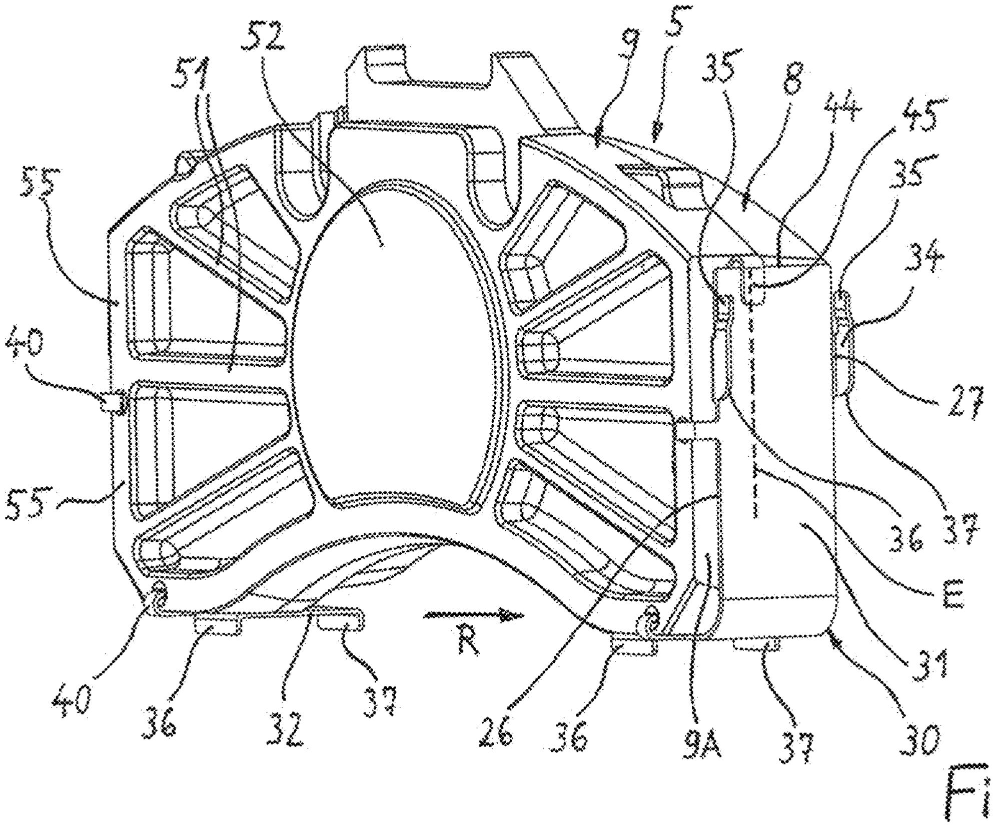
FIG. 3: shows the brake lining from its rear side with the angle brackets of the protective plate assembly fixed to it.

According to FIG. 2, the lining well 20 for the immediately acted-on inner brake lining 5 is situated in the brake carrier 2. The lining well 20 is used to hold, support, and guide the inner brake lining 5. This lining well 20 is situated on the side of brake disc 1 facing the inside of the vehicle.

The reaction-side outer brake lining 6, on the other hand, is situated in its own lining well on the outer side of the brake disc 1. In the exemplary embodiment, the lining well for the brake lining 6 is situated directly in the brake caliper 3, which for this purpose is provided with corresponding supporting surfaces for the outer brake lining 6.

Viewed towards the brake disc and thus in the brake application direction R, the lining well 20 for the inner brake lining 5 is a recess in the rigid brake carrier 2. The recess is open facing away from the axis of rotation A (FIG. 1) and otherwise has an approximately rectangular contour, for which reason the brake lining 5 that can be inserted into it also has a substantially rectangular shape, although this shape has arcuate rounded parts along its outer edge and in part also along its inner edge, corresponding to the circular shape of the brake disc 1.

The contour or wall of the lining well 20 comprises first supporting surfaces for supporting the brake lining 5 in the circumferential direction and second supporting surfaces for supporting the brake lining 5 radially inwards, i.e. towards the axis of rotation A. The two first supporting surfaces face each other. The two second supporting surfaces are aligned with each other. All first and second supporting surfaces extend over a certain width in the brake application direction R, i.e. in the direction of movement of the brake lining 5 when braking force is applied to it.

The brake carrier 2 is flat overall, but at least around the lining well 20, with an inner side 16 directed towards the inside of the vehicle and facing away from the brake disc, and an outer side 17 parallel to the inner side 16, directed towards the outside of the vehicle and facing the brake disc.

Two brackets 30, which together form a protective plate assembly, are arranged between the brake lining 5 and the first and second supporting surfaces of the lining well 20. The surfaces at which the brackets 30 are in contact with the first and second supporting surfaces of the lining well are arranged symmetrically in relation to the center of the lining well 20 in the circumferential direction, so that the disc brake exhibits the same braking behavior in both possible directions of rotation.

In the exemplary embodiment, the two brackets 30 of the protective plate assembly are angle brackets. The main body of the angle bracket is formed by a radial limb 31 with support against the first supporting surface of the lining well 20 and a tangential limb 32 with support against the second supporting surface of the lining well 20.

Figure 4:
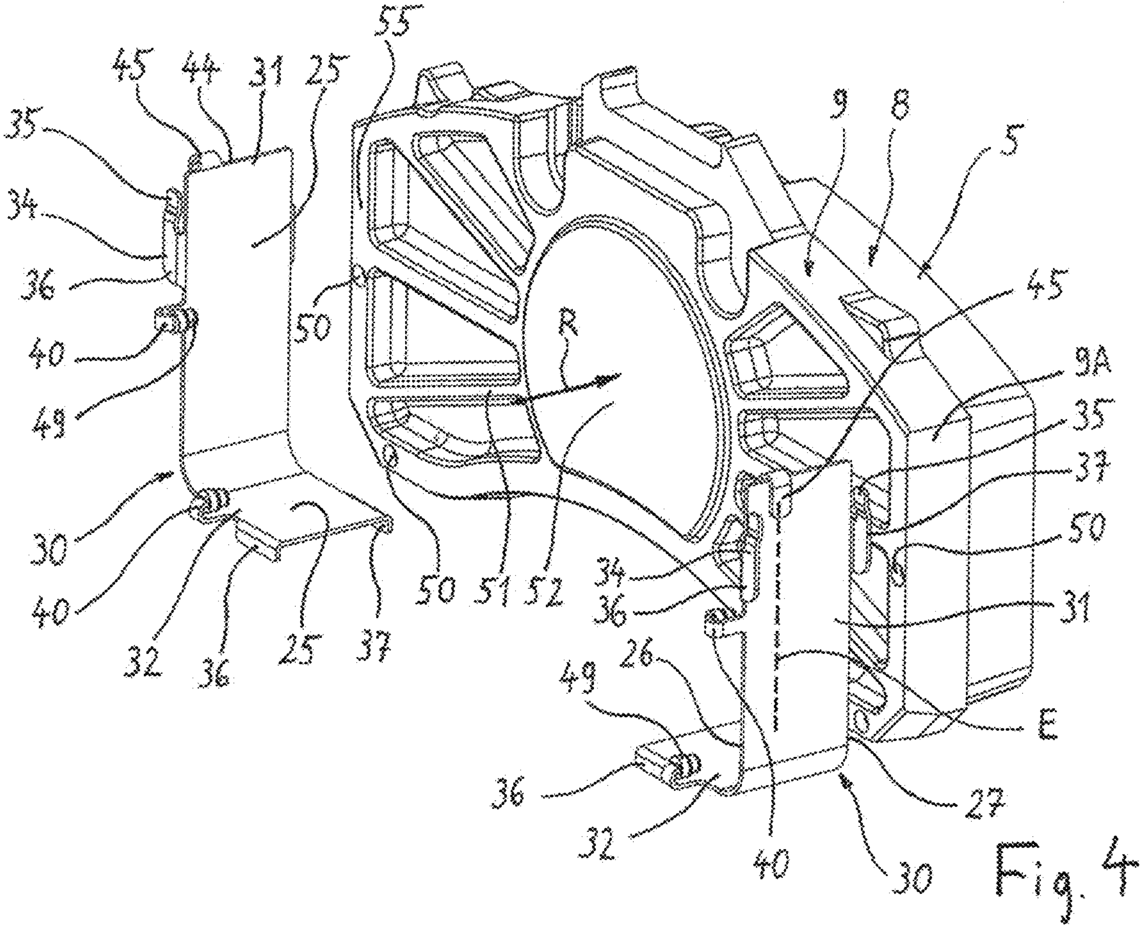
FIG. 4: shows the brake lining from its rear side with the angle brackets here shown separately, i.e. before they are fixed to the brake lining.

FIG. 4 shows that the radial limbs 31 and tangential limbs 32 each have contact surfaces 25 on their inner sides. The contact surfaces 25 serve to support the brake lining 5 against the braking reaction forces that occur during braking, as well as to guide the brake lining in the brake application direction R. To ensure sufficiently long guidance in the brake application direction R, where the brake application direction R is parallel to the axis of rotation A, the contact surfaces 25 of the radial limbs 31 and tangential limbs 32 each extend from an inner edge 26 to an outer edge 27.

Tabs 36, 37 are formed in pairs on the brackets or angle brackets 30 in order to fix them in the brake application direction R. An inner tab 36 is integrally formed on the inner edge 26. It is supported against the inner side 16 of the brake carrier 2. An outer tab 37 is integrally formed on the outer edge 27. It is supported against the outer side 17 of the brake carrier 2.

The inner and outer tabs 36, 37 are preferably arranged and formed symmetrically to one another on the bracket 30. An inner tab 36 and an outer tab 37 are situated both on the radial limb 31 and on the tangential limb 32.

The inner and outer tabs 36, 37 formed on the radial limb 31 each consist of a base portion 34 connected at right angles to the radial limb 31 and a clamping portion 35 extending away from the base portion 34. The distances of the clamping portions 35 from one another are smaller than the distances of the base portions 34 from one another. The distances of the clamping portions 35 from one another are in particular less than or at most equal to the thickness of the brake carrier 2 between its inner side 16 and its outer side 17. For resilient clamping behavior, the clamping portions 35 extend away from the base portions 34 in the direction of the main longitudinal extension of each radial limb 31.

When the brake lining 5 is fitted, i.e. during its insertion into the lining well 20, the angle brackets 30 are already fixed to the lining rear plate 9 of the brake lining 5. This fixation is temporary, and is achieved with retaining elements 40 which are formed on the brackets 30 and anchored in the lining rear plate 9. In the exemplary embodiment, each of the two angle brackets 30 is anchored in the lining rear plate 9 with two retaining elements 40, of which one retaining element 40 is formed on the radial limb 31 and the other retaining element 40 on the tangential limb 32 of the bracket.

The brake lining 5 is inserted into the lining well 20 from above, i.e. with the mounting direction parallel to the inner side of the brake disc 1, which inner side is formed as a friction surface. When the brake lining 5 is inserted into the lining well 20 with the brackets 30 fixed to it, the tabs 36 come into contact with the inner side 16 and the other tabs 37 come into contact with the outer side 17 of the brake carrier 2. This ensures that the brackets 30 are fixed to the brake carrier 2 in the brake application direction R and opposite the brake application direction R, and thus the brake lining 5 is also fixed in the lining well 20 in the brake application direction and opposite the brake application direction.

However, this fixing is only temporary. This is because the tabs 36 supported against the inner side 16 of the brake carrier 2 firstly and the retaining elements 40 secondly are designed and dimensioned differently in such a way that in the brake application direction R the fixing force of the tabs 36 is greater than the fixing force of the retaining elements 40. Therefore, if increased braking pressure is exerted against the lining rear plate 9 in the brake application direction R for the first time, only the retaining elements 40 give way, due to their lower fixing force, by releasing themselves from the lining rear plate 9. On the other hand, the tabs 36, which are more stable in comparison, retain their function of fixing the brackets 30 in the brake application direction R permanently, including during the entire subsequent braking operation.

The same applies to the other tabs 37, which ensure the function of fixing the brackets 30 to the brake carrier in the opposite direction, i.e. against the brake application direction R, during the entire subsequent braking operation.

At least one of the angle brackets 30, but preferably both, are provided with a single mounting indicator 45. This is formed in one piece on an edge 44 of the angle bracket 30 facing away from the tangential limb 32. In the mounted state, the mounting indicator 45 is situated in a plane E, which is arranged between the two parallel planes in which the inner side 16 and the outer side 17 of the brake carrier 2 are situated.

The decisive factor is that in the brake application direction R the distance from the plane E to the plane of the inner side 16 firstly and to the plane of the outer side 17 secondly is of different magnitude. For this reason, the plane E, in which the mounting indicator 45—of which there is of course only one—is situated when the brake lining 5 is correctly mounted, is not situated in the center between the inner side 16 and outer side 17, but outside this center. In addition, in the same plane E, and only in this plane, the brake carrier is provided with a structure 47 (FIG. 2)—of which there is also only one-into which the mounting indicator 45 engages by immersion.

In the exemplary embodiment, the mounting indicator 45 is arranged and fastened on an edge 44 of the radial limb 31 facing away from the tangential limb 32.

Likewise, as FIG. 4 shows, in the brake application direction R the distance from the plane E, in which the mounting indicator 45 is situated, to the plane of the inner edge 26 of the angle bracket 30 firstly and to the plane of the outer edge 27 of the angle bracket 30 secondly is of different magnitude. The mounting indicator 45 is therefore also not arranged in the center in relation to the planes in which the inner edges 26 and outer edges 27 of the brackets are situated.

The structure 47 is of a size such that the mounting indicator 45 just fits into it or, conversely, the structure 47 just fits into the mounting indicator.

To ensure cost-effective manufacture, the two angle brackets 30, including the tabs 36, 37, the retaining elements 40, and the mounting indicator 45, are one-piece stamped and bent parts made of metal, wherein not only the tabs 36, 37, but also the mounting indicator 45, and preferably also the retaining elements 40, are tabs produced in a bending process.

The mounting indicator 45 is situated on the outer side of the radial limb 31. It is therefore situated on the side of the radial limb 31 facing away from the contact surface 25, which in the assembled state is situated opposite the first supporting surface of the lining well 20.

In the exemplary embodiment, the mounting indicator 45 is designed as a tab or arm. So that the free end of the arm, which extends in the main direction of extension of the radial limb 31, can be immersed in the structure 47, this end is connected to the edge 44 over an 180° arc.

The structure 47 of the brake carrier 2 that accommodates the mounting indicator 45 is a recess 47 in the brake carrier 2. The recess 47 is situated outside the lining well 20. In particular, it is situated on the upper side of the brake carrier 2 facing away from the second supporting surfaces of the lining well 20.

Preferably, the recess 47 is a blind hole which is open facing away from the second supporting surfaces. The width of the recess 47 is such that the mounting indicator 45 enters the recess 47 without making contact.

The retaining elements 40 are tabs or arms, formed on the angle brackets 30, which engage in recesses 50 on the rear side of the lining rear plate 9 by immersion. Preferably, each retaining element 40 is fixed in the respective recess 50 by means of a dowel 49, the dowel 49 being attached to the tab or to the arm. The dowel 49 is preferably made of a plastics material.

The recesses 50 are blind holes which are open facing away from the friction lining 8, so that the dowels 49 can be placed in them with frictional engagement.

To reduce the weight, the rear side of the lining rear plate 9 has struts 51 which extend in a radiating pattern from a strut-free central region 52 of the lining rear plate 9 against which the pressure member of the brake works when braking is applied, up to a frame-shaped reinforcing edge 55. The recesses 50 are situated in the reinforcing edge 55 so as to save space.

The decisive factor in the solution described is that in the brake application direction R the spacing of the plane E of the mounting indicator 45 from the plane of the inner side 16 firstly and from the plane of the outer side 17 secondly is of different magnitude. As a result, the mounting indicator 45 is only in engagement with the structure 47 on the brake carrier 2 when the friction lining 8 is facing the brake disc, and not when the lining rear plate 9 is facing the brake disc. When attempting to insert the brake lining 5 equipped with the angle brackets 30 into the lining well 20, it can already be recognized whether the lining has been fitted in the correct installation position.

If the installation position is incorrect, and in particular if it is rotated by 180°, the positions of the mounting indicator 45 and the corresponding structure 47 on the brake carrier 2 do not match, because the mounting indicator 45 firstly and the structure 47 on the brake carrier secondly are then situated in different planes. The brake lining 5 fitted with the brackets 30 then cannot be lowered completely into the lining well 20. This in turn has the consequence that a U-bolt that extends over the lining well 20 in the transverse direction cannot be closed as intended. At this point, at the latest, this makes it clear that the brake lining 5 was not inserted into the lining well in the intended installation position.

In a second embodiment of the invention, not shown in the drawing, the mounting indicator is an indentation, formed transversely to the brake application direction R, in the radial limb 31 of the angle bracket 30. The indentation dips into a similarly eccentric groove extending in the brake application direction R. The groove is situated on that edge 9A, extending in the radial direction, of the lining rear plate 9 (FIG. 4) with which the lining rear plate 9 is supported on the radial limb 31 when the braking forces are dissipated.

In the exemplary embodiment, the protective plate assembly comprises two separate angle brackets 30, i.e. two separate main bodies. It is also possible to provide only a single plate which combines the shapes of the two angle brackets 30 and whose single-part main body then comprises both radial limbs 31 and both tangential limbs 32.

In a further embodiment of the invention, not shown in the drawing, a pin or a short screw extending transversely to the brake application direction R then acts as the retaining element 40. The pin or screw can be made of a plastics material and remains intact, i.e. it holds the respective bracket 30 on the lining rear plate 9, until the brake lining is inserted into the mounting position. The pin or screw shears off at one edge of the lining well only when the unit consisting of brake lining 5 and brackets 30 is inserted into the lining well 20.

LIST OF REFERENCE NUMBERS

1 Brake disc
2 Brake carrier
3 Brake caliper
5 Brake lining inside
6 Brake lining outside
8 Friction lining
9 Lining rear plate
9A Edge of the lining rear plate
16 Inner side
17 Outer side
20 Lining well
25 Contact surface
26 Inner edge
27 Outer edge
30 Bracket, angle bracket
31 Radial limb
32 Tangential limb
34 Base portion
35 Clamping portion
36 Tab
37 Tab
40 Retaining element
44 Edge
45 Mounting indicator
47 Structure, recess
49 Dowel
50 Recess
51 Strut
52 Central region
55 Reinforcing edge
A Axis of rotation of the brake disc
E Plane
R Brake application direction

What is claimed is:

1. A disc brake with a brake carrier that can be mounted on a vehicle axle and a brake caliper that bridges an inner brake lining arranged on the inner side of a brake disc and an outer brake lining arranged on the outer side of the brake disc, wherein each of the inner brake lining consist and the outer brake lining consists of a friction lining facing the brake disc and a lining rear plate, and a pressure member guided in the brake caliper can be applied against the lining rear plate of the inner brake lining, wherein the brake carrier for receiving the inner brake lining has a lining well with two mutually facing first supporting surfaces for supporting the inner brake lining in the circumferential direction and second supporting surfaces for supporting the inner brake lining radially inwards, and, at least in a region surrounding the lining well, the brake carrier is formed flat with an inner side and a parallel outer side, wherein the inner brake lining is inserted into the lining well from above in a mounting direction parallel to the inner side of the brake disc, the inner side of the brake disc being formed as a friction surface, wherein a respective bracket is arranged between the inner brake lining and each of the two first supporting surfaces, an inner tab and an outer tab being formed on each respective bracket for fixing the respective bracket in the brake application direction, the inner tab being supported against the inner side of the brake carrier and the outer tab being supported against the outer side of the brake carrier, characterized in that the brackets are fixed to the lining rear plate of the inner brake lining by means of retaining elements, so that, when the inner brake lining with the brackets thereto is inserted into the lining well, the inner tabs come into contact with the inner side of the brake carrier and the outer tabs come into contact with the outer side of the brake carrier, in that the fixing force of the retaining elements in the brake application direction is lower than the fixing force of the inner tabs supported against the inner side of the brake carrier, in that at least one of the brackets is provided with a mounting indicator which is situated in a plane between the inner side and the outer side of the brake carrier, wherein, in the brake application direction, the distance of the plane from the inner side of the brake carrier differs from the distance of the plane from the outer side of the brake carrier, and in that the brake carrier is provided, in the same plane, with a structure in which the mounting indicator engages or which engages in the mounting indicator.

2. The disc brake according to claim 1, characterized in that the brackets are angle brackets, each of which bears with its radial limb against a respective first supporting surface and with its tangential limb against a respective second supporting surface of the lining well.

3. The disc brake according to claim 2, characterized in that further inner and outer tabs are formed on each tangential limb, each inner tab being supported against the inner side and each outer tab being supported against the outer side of the brake carrier.

4. The disc brake according to either claim 2, characterized in that the respective surfaces of the brackets that contact with the first and second supporting surfaces are arranged symmetrically with respect to the center of the lining well in the circumferential direction.

5. The disc brake according to claim 1, characterized in that the brackets including the tabs and the mounting indicator are one-piece stamped and bent parts.

6. The disc brake according to claim 2, characterized in that the inner and outer tabs formed on each radial limb each consist of a base portion connected to the respective radial limb and a clamping portion extending away from the base portion, wherein, for each radial limb, the distance between the clamping portions of the inner and outer tabs is smaller than the between the base portions of the inner and outer tabs.

7. The disc brake according to claim 6, characterized in that the clamping portions extend away from the base portions in the longitudinal direction of the respective radial limb.

8. The disc brake according to claim 2, characterized in that the mounting indicator is formed on an edge of the radial limb of the bracket provided with the mounting indicator, the edge facing away from the tangential limb of that bracket.

9. The disc brake according to claim 8, characterized in that the mounting indicator is connected to the edge over an 180° arc and otherwise extends parallel to the radial limb of the bracket provided with the mounting indicator.

10. The disc brake according to claim 1, characterized in that the structure with which the brake carrier is provided is a recess into which the mounting indicator engages by immersion.

11. The disc brake according to claim 10, characterized in that the recess is an open blind hole facing away from the second supporting surfaces of the lining well.

12. The disc brake according to claim 1, characterized in that the retaining elements are arms formed on the brackets, which engage in recesses on the rear side of the lining rear plate by immersion.

13. The disc brake according to claim 12, characterized in that the recesses are blind holes which are open facing away from the friction lining.

14. The disc brake according to either claim 12, characterized in that the retaining elements are fixed in the recesses by means of dowels.

15. The disc brake according to claim 12, characterized in that the lining rear plate has struts on its rear side for weight reduction, which extend from a strut-free central region to a frame-shaped reinforcing edge, and in that the recesses are situated in the frame-shaped reinforcing edge.

16. A protective plate assembly for arranging between a brake carrier of a disc brake and a brake lining guided in a lining well of the brake carrier in the brake application direction, the brake carrier having an inner side and an outer side and the disc brake having a brake disc with an inner side formed as a friction surface, with a single-part or two-part main body consisting of a total of two radial limbs and two tangential limbs, of which the radial limbs are provided with mutually facing contact surfaces and the tangential limbs are provided with mutually aligned contact surfaces for the support and for the guidance of the brake lining in the brake application direction, and the radial limbs and tangential limbs each extend in the brake application direction from a respective inner edge to a respective outer edge, with inner tabs formed on the inner edges and outer tabs formed on the outer edges, wherein each inner tab is formed for support against the inner side of the brake carrier and each outer tab is formed for support against the outer side of the brake carrier, and with a mounting indicator designed to engage in a structure of the brake carrier, the mounting indicator being formed on an indicator-carrying radial limb constituted by one of the two radial limbs and arranged in a plane between the inner edge and the outer edge of the indicator-carrying radial limb, wherein, in the brake application direction, the distance of the plane from the inner edge differs from the distance of the plane from the outer edge, characterized by retaining elements which are designed for fixing the main body to the brake lining, so that, when the brake lining with the protective plate assembly fixed thereto is inserted into the lining well from above in a mounting direction parallel to the inner side of the brake disc, the inner tabs come into contact with the inner side of the brake carrier and the outer tabs come into contact with the outer side of the brake carrier.

17. The protective plate assembly according to claim 16, characterized in that the mounting indicator is integrally formed on an edge of the indicator-carrying radial limb facing away from the tangential limb connected to the indicator-carrying radial limb.

18. The protective plate assembly according to claim 16, characterized in that the mounting indicator is situated on the side of the indicator-carrying radial limb facing away from the contact surface of the indicator-carrying radial limb.

19. The protective plate assembly according to claim 17, characterized in that the mounting indicator is connected to the edge over an 180° arc and otherwise extends parallel to the indicator-carrying radial limb.

20. The protective plate assembly according to claim 16, characterized in that the single-part or two-part main body including the tabs and the mounting indicator is a stamped and bent part.

21. The protective plate assembly according to claim 16, characterized in that the inner and outer tabs formed on each radial limb each consist of a base portion connected to the respective radial limb and a clamping portion extending away from the base portion, wherein, for each radial limb, the distance between the clamping portions of the inner and outer tabs is smaller than the distance between the base portions of the inner and outer tabs.

22. The protective plate assembly according to claim 21, characterized in that the clamping portions extend away from the base portions in the longitudinal direction of the respective radial limb.

23. The protective plate assembly according to claim 16, characterized in that the fixing force of the retaining elements in the brake application direction is lower than the fixing force of the inner tabs.

24. The protective plate assembly according to claim 16, characterized in that the retaining elements are integrally formed arms.

25. The protective plate assembly according to claim 24, characterized in that the retaining elements carry dowels.

26. A brake lining having a protective plate assembly fixed thereon according to claim 16.

* * * * *